Patented Aug. 6, 1940

2,210,774

UNITED STATES PATENT OFFICE

2,210,774

FIBERS FROM ETHYLENE POLYMERS

Michael Willcox Perrin, John Greves Paton, and Edmond George Williams, Northwich, England, assignors to Imperial Chemical Industries Limited, a corporation of Great Britain No Drawing. Application March 11, 1937, Serial No. 130,416. In Great Britain March 16, 1936

7 Claims. (Cl. 28—1)

This invention relates to new synthetic threads and fibers, including staple fibers, their manufacture, and their conversion into yarns, fabrics and other textile materials.

In U. S. Patent No. 2,153,553 there is described new polymers of ethylene and processes for preparing said polymers by subjecting ethylene to pressures in excess of 500 atmospheres under controlled elevated temperature conditions, namely, from 100° C. to 400° C., and preferably 150° C. to 250° C. This results in various polymers of ethylene, the molecular weight of which varies depending particularly upon the pressure employed. By using pressures of more than 1000 atmospheres solid polymers of ethylene can be formed. According to another variant of the invention a small quantity of oxygen is introduced into the ethylene before it is heated. This forms a polymer of ethylene which contains a very small quantity of oxygen in chemical combination. In this specification where polymers of ethylene are referred to we also intend to include the polymers which contain a small quantity of oxygen. The solid ethylene polymers obtained by the above mentioned methods have a molecular weight of at least 6000, a melting point of from about 100° C. to about 120° C. depending upon the molecular weight, correspond in composition substantially to $(CH_2)_x$, and when subjected to X-ray diffraction analysis show a crystalline structure.

This invention has as an object to make new and useful threads, fibers, staple fibers, yarns, twists, woven materials and the like, utilizing these new solid polymers of ethylene. A further object is to devise a method of making staple fibers, twists, yarns, and woven materials, utilizing the said new polymers. Further objects will appear hereafter.

The above objects are accomplished by the following invention. We have found that the said solid polymers of ethylene, obtained by the processes described in the above application can be spun, extruded or otherwise formed into a fiber or thread as more fully described below; further, that such fibers can be gathered to give a hank or collection which, when cut into any desired lengths form a typical, fluffy kind of staple fiber; further, that said staple fiber can be converted into a yarn or twist which in turn may form the basis for the manufacture of fabrics e. g. woven and knitted fabrics.

Fibers or threads of high strength can be obtained by selecting as the initial material a polymer of relatively high molecular weight and/or employing conditions which ensure a definite orientation of the molecules along the fiber axis. Such conditions are to draw out the relatively unoriented thread in the cold, when the length increases, and the diameter decreases. During the drawing process, the molecules become more and more oriented in the direction of pull, and finally maximum orientation is obtained when the thread has been extended about five times its original length. This orientation can be clearly demonstrated by X-ray diffraction photographs of the original and drawn material. It is also demonstrated by the fact that the drawn fibers exhibit parallel extinction when observed between crossed nicols. The oriented fibers are stronger and more pliable than the unoriented product and in general more useful in making fabrics. By cold drawing as the term is used herein we mean permanently elongating filaments, etc., at approximately room temperature or at temperatures below their softening point.

The aforesaid single threads or fibers are useful in the preparation of yarns and fabrics. They can also be formed into staple fibers. For example, the continuous fibers or threads can be collected together to provide a hank or bundle of threads, which is cut up to form a staple fiber. In a typical procedure, the initial polymer is melted and extruded thru a series of fine holes (as in a rayon spinneret) under steady pressure, e. g. by means of a gas, or by means of a constant volume delivery pump. The temperature on the delivery side of the fine holes is so adjusted that the polymer solidifies shortly after its emergence from the holes. The threads formed are collected and wound on to a bobbin, preferably at such a speed that they are to a certain extent drawn out, thereby producing a certain degree of orientation in the structure. If desired, the fibers can be cold drawn in a separate operation or as an integral part of the spinning operation. Another method consists in stretching in bulk a hank of threads. For the preparation of staple fibers, the hanks may be cut into desired lengths, e. g., one to six inches.

According to a further feature of the invention, a sliver of the aforesaid staple fiber is converted, by suitable twisting and pulling operations, into a yarn or twist. This yarn or twist is the basis for the manufacture of textile materials such as woven fabrics.

Threads, staple fibers, yarns and fabrics obtained in accordance with this invention are highly resistant to water; they are insensitive to conditions of humidity and at ordinary temperature their wet strength is substantially equal to their dry strength. They are also resistant to alkali, acids, and many chemicals and are characterized by their combination of this property with strength, elasticity, cohesion and lightness. The fibers are pliable and can be tied into hard knots without materially decreasing their tenacity. The elastic recovery of the fibers is such that when stretched 4% for one minute they recover at least 80% of their extension in one minute. In some respects, e. g. cohesion, they resemble wool, and in others they resemble silk or cotton; in the aggregate, their properties are not matched by those of any single textile material. The fibers and fabrics can be dyed or otherwise treated for special purposes.

The following examples illustrate but do not limit the invention.

*Example 1*

In this example is described the production of a strong, single thread of ethylene polymer. The polymer, obtained at a pressure of 1500 atmospheres and a temperature of 200° C. and having a molecular weight of 12,000, is melted by heating at 150° C. and extruded under pressure thru a spinneret orifice of 0.1 mm. diameter.

The thread is drawn away at a speed in excess of the extrusion speed, solidifies on cooling and is wound onto a reel. The continuous thread thus obtained may be further treated by stretching in the cold, whereby it is drawn out in the cold to a length five times the initial length, thereby increasing the tensile strength, by orienting the molecules composing it. The thread may be formed into yarns which are useful in making knitted and woven fabrics.

*Example 2*

This example shows the production of staple fiber from the ethylene polymer.

A number of continuous threads are prepared as in Example 1, by extrusion thru a spinneret, and are wound into a hank. The hank is then stretched in the cold till the molecules in the fibers are completely oriented, and is then cut up into lengths of 2½ inches to give a fluffy staple fiber.

*Example 3*

This example describes the production of elastic threads, having different tensile strengths.

Threads are made as in Example 1, but starting with material of varying molecular weight.

These threads when fully oriented all show considerable elasticity, e. g. when stretched by 3% they recover at least 70% of the stretch within 2 secs. The tensile strength is higher, the higher the molecular weight of the initial material. Thus:

| Molecular weight | Tensile strength |
|---|---|
|  | $Kgs./mm.^2$ |
| 6,000 | 3.5 |
| 10,500 | 8.5 |
| 15,000 | 10.0 |
| 21,000 | 21.0 |

For the preparation of fibers from the ethylene polymers we prefer to use those having molecular weights of more than about 12,000 as determined by the method described in U. S. Patent No. 2,153,553.

It will be evident from the foregoing description that our invention describes a wholly new and valuable type of synthetic fiber, and is therefore an outstanding contribution to this art. Our fibers represent the first useful fibers derived from open chain olefin hydrocarbon polymers. The fact that they show by X-ray diffraction patterns orientation along the fiber axis places them in the field of true fibers. Moreover, they are of light weight and are resistant to water, alkalis and acids. A further advantage of these fibers is that fabrics and the like made therefrom when worn out can be remelted and again formed into fibers. The fibers of our invention whether in the form of staple or continuous filaments can be used to advantage in making fabrics of widely different types. They can also be used in conjunction with other fibers to form mixed fabrics, etc.

As many apparently widely different embodiments of this invention may be made without departing from the spirit and scope thereof, it is to be understood that we do not limit ourselves to the specific embodiments thereof except as defined in the appended claims.

We claim:

1. Fibers comprising essentially a polymer of ethylene having its molecules oriented along the fiber axis.

2. A fabric containing fibers comprising essentially a solid polymer of ethylene.

3. A dyed fiber comprising essentially a solid polymer of ethylene.

4. A fiber comprising essentially a polymer from ethylene which is a solid at normal temperatures, which corresponds in composition substantially to $(CH_2)_x$, and which by X-ray diffraction analysis shows a crystalline structure.

5. Staple fibers comprising essentially a polymer from ethylene which is a tough solid at normal temperatures, has a melting point from about 100° C. to about 120° C., corresponds in composition substantially to $(CH_2)_x$, and has a molecular weight of at least 6000.

6. A continuous thread comprising essentially a polymer from ethylene which is a solid at normal temperatures, which corresponds in composition substantially to $(CH_2)_x$, and which by X-ray diffraction analysis shows a crystalline structure.

7. A yarn comprising a plurality of fibers comprising essentially a polymer from ethylene which is a solid at normal temperatures, which corresponds in composition substantially to $(CH_2)_x$, and which by X-ray diffraction analysis shows a crystalline structure.

MICHAEL W. PERRIN.
JOHN G. PATON.
EDMOND G. WILLIAMS.